United States Patent [19]

Braithwaite, Jr.

[11] Patent Number: 4,671,040
[45] Date of Patent: Jun. 9, 1987

[54] METHOD FOR FLAMEPROOFING SHINGLED SURFACES

[76] Inventor: Charles H. Braithwaite, Jr., 11232 Tigrina, Whittier, Calif. 90603

[21] Appl. No.: 759,328

[22] Filed: Jul. 26, 1985

Related U.S. Application Data

[63] Continuation-in-part of Ser. No. 600,987, Apr. 16, 1984, abandoned, which is a continuation-in-part of Ser. No. 426,629, Sep. 29, 1982, Pat. No. 4,443,520.

[51] Int. Cl.$^4$ ............................ F04D 1/00; B05D 5/00
[52] U.S. Cl. ........................................ 52/748; 427/260; 427/261; 427/284; 427/286
[58] Field of Search .................. 52/744, 748; 156/71; 428/921; 427/284, 286, 260, 261

[56] References Cited
U.S. PATENT DOCUMENTS 4,223,066  9/1980  Boyle ................................ 428/541

Primary Examiner—Evan K. Lawrence
Attorney, Agent, or Firm—Plante Strauss Vanderburgh

[57] ABSTRACT

There is disclosed a method for flame-proofing of shingled roof coverings wherein the shingles are coated on at least their exposed sides with a flame-proofing composition and the roof covering is provided with at least one continuous bead of a flame-proofing caulking composition which extends coextensively with each course of the shingles, thereby sealing each course of shingles to the underlying or subjacent course of shingles. The preferred flame-proofing composition is a mixture of a thermoplastic, ambient-temperature, film former such as a polyvinyl acrylic acetate latex, and alumina trihydrate and glass fibers. The preferred caulking composition has the same composition and also contains a thixotropic ingredient to obtain a paste consistency. The film former is a conventional latex used for coating compositions and should have the property of softening at or below the dehydration temperature of alumina trihydrate (about 280 degrees F.) and be capable of forming a stable foam at such temperatures. The alumina, the major portion of the coating composition, dehydrates when subjected to flame temperatures and the water vapor released from the alumina forms a stable foam. Additionally, the alumina and the glass fibers, which are used as a filler in the composition, form a refractory coating when subjected to flame and this coating traps the gases and serves as a refractory heat insulation that protects and isolates the combustible material from exposure to the flame and ignition.

14 Claims, No Drawings

METHOD FOR FLAMEPROOFING SHINGLED SURFACES

RELATIONSHIP TO PENDING APPLICATIONS

This application is a continuation in part of my pending application Ser. No. 600,987, filed Apr. 16, 1984, now abandoned which is a continuation in part of my parent application, Ser. No. 426,629, filed Sept. 29, 1982, now U.S. Pat. No. 4,443,520, issued Apr. 17, 1984.

BACKGROUND OF THE INVENTION

1. Field of Invention

This invention relates to flame-proofing of shingled surfaces and, in particular, to a method of treating wood shingled surfaces to impart flame resistance thereto.

2. Brief Statement of the Prior Art

Flame-proofing treatments of wood have generally used intumescent compositions such as tri-ammonium phosphate, polyhydric alcohols and mitrogenous materials. Upon exposure to the flame, the ammonium phosphate decomposes, absorbing heat to decrease the temperature of the coated item. Frequently, the gases released from intumescent coatings are toxic.

Halogenated polymers have also been used as flame-proofing agents and are applied by pressure impregnation, a costly method. Bromine and chloride are most commonly used in epoxy polymers, polyesters and vinyl polymers. Additionally, inorganic materials such as zinc borate and antimony oxides are added to decrease the flammability of the coatings. As with intumescent coatings, these halogenated polymer coatings also release highly toxic gases. Flame resistance of wood substrates has also been achieved to some degree by pressure impregnation of wood with silicates, phosphates and borates. The flame resistance achieved with these treatments is not entirely permanent as the materials are lost from the substrate upon weathering, and this loss is particularly acute with topically applied coatings which lack the limited degree of permanency of impregnated coatings. Additionally, toxicity of the decomposition products can be a problem with these flame retardants also.

Alumina trihydrate is an ideal material for achieving flame retardancy since it releases water vapor when heated above about 280 degrees F. This water vapor release absorbs heat from the advancing flame and protects the substrate. Heretofore, however, there has been no coating developed which traps the water vapor released from alumina trihydrate to form a foam which contains the water vapor and pyrolysis gases beneath a refractory and thermal insulating barrier over the wood substrate.

In my aforementioned parent application, I have disclosed a flame-proofing composition which is a mixture of a thermoplastic, ambient-temperature film former such as a latex polyvinyl acetate, alumina trihydrate and an inorganic fiber filler such as glass fibers.

A major problem in fire retardant systems for wood shake or shingle roofs is flame penetration through "breathing" of the roof. Typical home applications of shake or shingles are installed for esthetic reasons. Particularly with wood shake, under the dual attack of flame and wind, the flames can be driven beneath the shingles and can initiate combustion of the undersurface of shingles which are only treated on their exposed surfaces, or of the underlayment, which is often of a quite flammable material, e.g., tar, asphalt and resin impregnated paper.

BRIEF STATEMENT OF THE INVENTION

This invention comprises a method for flame-proofing of shingled roof coverings and includes the application of continuous beads of a flame-proofing caulking composition with at least one continuous bead applied between each course of shingles and the subjacent course of shingles. The flameproofing composition is of a caulking paste or semi-solid consistency and, for this purpose, includes a suitable thixotropic or thickening agent to achieve a paste like consistency. When the invention is applied to existing roof coverings, the caulking composition is applied as a continuous horizontal bead between the exposed, butt edges of the shingles in a continuous course and the underlying or subjacent course of shingles. Additionally, it is prefered to fill the exposed gaps between the longitudinal edges of each of the individual shingles with the caulking composition, thereby effectively sealing the entire undersurface against flame intrusion or penetration.

The flame-proofing caulking composition which is used in the invention is a mixture of a thermoplastic, ambient temperature film former such as latex of a thermoplastic polymer, alumina trihydrate and an inorganic fiber reinforcement, preferably glass fiber and a thixotropic additive to form a caulking compound.

The flame-proofing surface coating composition is coated on at least one surface of the shingle substrate to a film thickness from about 0.05 to about 0.25 inch, sufficient to provide a protective coating. After the application of the coating, the coating is dried at a temperature from ambient to about 280 degrees F., for a time sufficient to remove water therefrom and form a dry coating without effecting any dehydration of the alumina trihydrate. The drying step can be performed by passing the wood products through an oven maintained at a desired elevated temperature or by the application of microwave radiation to the coated product. For this purpose the drying treatment can be at subatmospheric pressure using conventional equipment, e.g., a jet condenser, to process the steam vapor from the drying oven.

The coating is effective to impart the flame resistance to the substrate. Dipped coatings, which are on both sides can achieve a Class I fire resistance rating. When the coatings are applied to one side only, e.g., by spraying onto an existing roof a Class II or Class III fire resistance rating can be achieved. These ratings are by ASTM-E108 test. When contacted with a flame, the coating absorbs the heat of the flame, softening the ambient temperature film former (thermoplastic polymer) and releasing water vapor from the alumina trihydrate. The water vapor released from the alumina foams and expands the thermoplastic polymer coating to form a very refractory and heat insulating foam. Further exposure to flame burns out the polymer and plasticizer to form a hard refractory and thermal insulating barrier comprising the alumina and glass fibers. The water vapor is trapped in the foam by the alumina and glass fiber refractory, hard coating on the outer surface of the foam. The underlying wood pyrolyzes and the pyrolysis gases are also trapped beneath the outer surface coating, insuring an oxygen-free atmosphere over the wood, preventing its ignition.

The composition used comprises a mixture (on a water-free basis) of from 20 to about 40 weight percent of a thermoplastic ambient temperature film forming polymer, from 40 to about 80 weight percent of alumina trihydrate, from 2 to about 10 weight percent of an inorganic fiber, preferably glass fibers with minor amounts of other ingredients such as pigments and the like. The vehicle for the solids of the composition is chiefly water, although other solvents such as propylene glycol can be used together with plasticizers for the polymer such as the alkyl esters of the dicarboxylic aliphatic acids, e.g., dioctylphthalate. The ambient temperature film former is available as commercially available latexes of film forming thermoplastic polymers such as polyvinyl acetate, polyacrylates and styrene butadiene polymers, and halogenated derivatives such as, polyvinylidene chloride, polyvinyl chloride, etc. The composition comprises a suspension of the aforementioned solids and is prepared by admixture of water alumina, and glass fibers to a commercial latex of the ambient-temperature film former to provide a suspension having a solids content from about 40 to 65 percent, preferably from 45 to 55 percent.

The flame-proofing suspension of the invention is applied as a coating to a wood substrate by dipping, rolling, brushing, or spraying. As necessary, suitable thickening agents and gums such as cellulose derivatives can be added to the suspension to achieve a desired viscosity that permits the application of suitably thick coatings in a single application. The coatings are applied in one or more applications to provide a coating thickness from 0.020 to 0.100 inch, preferably from 0.030 to 0.050 inch. The desired thickness can be achieved in a single pass application, even when spraying by adjustment of the viscosity of the suspension.

DESCRIPTION OF PREFERRED EMBODIMENTS

The invention is a method of flame-proofing shingled coverings, particularly applicable to wood shingled roofs, and sides of buildings. The invention is applicable to shingles and shingled coverings formed entirely or substantially of wood, e.g., red cedar shingles. It is also applicable to shingles and shingled coverings formed of wood derivatives such as particle board, wafer board, etc.

In my parent application, I disclose and claim an aqueous suspension of a flameproofing composition which I have found to be very effective in flameproofing the exposed surfaces of wood products such as shingles. This flamproofing composition includes a thermoplastic film forming carrier in which is suspended a large quantity of alumina trihydrate and, preferably, a fiber reinforcement such as chopped glass fibers.

One difficulty which is experienced with the use of any flame-proofing composition is that when the flame-proofed shingled surfaces are exposed to severe combustion conditions such as flame contact at wind velocities of 10 miles per hour or greater, the flames can intrude beneath the shingles and the underlying structure is exposed to the flame. When the flame-proofing composition has been applied to the exposed surfaces of an existing roof, the undersurfaces of the shingles are not flame resistant and can readily ignite under such severe ignition conditions. Furthermore, even when the shingles have been flame-proofed prior to application, e.g., by being dipped in the flame-proofing composition and both sides of the shingles are flame resistant, the intrusion of flames beneath the shingles can often expose the underlying structure which is usually of a highly combustible nature since it includes a water repellant membrane such as tar and resin impregnated paper.

This invention effectively isolates the shingles and underlying structure against flame intrusion by the application of continuous beads of a flameproofing caulking composition between each course of shingles and the underlying or subjacent course of shingles.

The method is applied to existing roofing by the application of the caulking composition as a continuous bead, using conventional caulking applicators such as a manually pressured caulking gun, pneumatic caulking equipment and the like. The continuous bead of flameproofing caulking is applied at the base or butt ends of each course of shingles and the caulking bead is forced into the continuous crack between the butts of the course of shingles and the underlying surface of the subjacent course of shingles. This bead forms a continuous seal at the base of each continuous course of shingles.

In addition, the caulking composition can be applied between the adjacent edges of the individual shingles. With existing roofing, the beads of caulking composition are applied in the exposed gaps between the edges of adjacent shingles while if applied while the shingles are laid in a new roof, the caulking composition can be extended along the entire length of the gap between the edges of adjacent shingles. Since the preferred caulking composition expands when exposed to flame, it can be used to flame-seal these gaps without precluding the need for accomodation of swelling of the shingles during normal life.

When the invention is applied with the application of new shingling, the continuous beads are preferably laid as at least one and, preferably, two, continuous and horizontal beads between the undersurface of a course of shingles and the covered, underlying surface of the subjacent course of shingles. This effectively locates the continuous beads in a completely covered or unexposed location and isolates the caulking composition beads from weathering conditions.

The invention includes the coating of wood shingles with a flame retardant compostion, and drying of the coating to form a non-tacky film on the surface thereof. The flame-proofing composition which I prefer to use is an aqueous suspension of solid flameproofing ingredients. The major components of the flameproofing composition are set forth in the following table in weight percentages of the final composition, expressed on a water-free basis:

TABLE 1

| COATING COMPOSITIONS | | |
|---|---|---|
| INGREDIENT | BROAD | PREFERRED |
| Gum | 0.05–2 | 0.5–2 |
| Thermoplastic film former | 20–40 | 25–35 |
| Alumina trihydrate* | 40–80 | 60–70 |
| Mineral fibers | 2–10 | 3–5 |
| Pigments | 0–2 | 0–1 |
| Plasticizer | 4–10 | 5–7 |

*The weight percent includes the water of hydration

The gum used in the coating composition is a cellulosic derivative such as carboxymethylcellulose or hydroxyethylcellulose and is used in a sufficient concentration to permit the desired coating thicknesses of 0.020 to 0.100 inch to be achieved using a single pass application dipping, brushing, rolling or spraying. The actual concentration of gum used can be determined for the selected application method by simple trial testing, adding the gum at incrementally increasing concentrations until test applications achieve the desired coating thickness without run-off. Generally, concentrations sufficient to raise the viscosity of the suspension of solids to a value from about 5,000 to about 20,000 centipoise seconds, preferably to a value from about 7,500 to about 12,000 centipoise seconds, are used. The method of the application preferably uses a single coating, however, two or more coating applications can be used as needed.

The caulking composition uses the same active ingredients, however, sufficient thixotropic additive is used to form a paste. This can be a greater content of the aforementioned gums, e.g., from 1 to 5 weight percent, or, if desired, other thixotropic additives such as silica gel and expanding lattice clays can also be used for this purpose, typically at concentratrions from 1 to about 6 weight percent. The actual concentration of the thixotropic additive can be selected by addition of the thixotropic additive in increments of 0.5 to about 1.5 weight percent each to samples of the coating composition until the desired paste consistency is obtained.

The thermoplastic film former used in the invention is a a thermoplastic polymer which is available as a latex, such as used in various coating and adhesive compositions. The latexes are 65 weight percent solids, usually about 50 weight percent solids. The polymers which form suitable film formers include the polyvinyl esters, polyacrylates and styrene-butadiene copolymers and halogenated derivatives thereof.

The vinyl ester polymers are commonly interpolymerized with polymerizable comonomers including film forming temperature regulators such as unsaturated nitriles, alkyl acrylates or methacrylates. Commonly, the matrix monomer of the vinyl ester interpolymer is vinyl ester, usually vinyl acetate, although other esters such as vinyl butyrate, vinyl propionate, etc., can also be used. Vinyl ester polymers generally form films at temperatures slightly in excess of common ambient temperatures. The vinyl esters such as vinyl acetate can be copolymerized with ethylene or with other film forming, temperature regulating comonomers such as ethyl acrylate, methyl acrylate, isopropyl acrylate, 2-ethylhexyl acrylate, acrylonitrile, etc. These additional monomers can be used at concentrations from about 1 to about 20 weight percent of the vinyl ester.

Another suitable class of latexes are the styrene butadiene polymers and copolymers which can contain other comonomers such as the aforementioned acrylates and acrylonitrile.

Preferably a plasticizer is used with the polymer in the aforementioned quantities to increase the resilience and flexibility of the polymer film. The selection of a plasticizer depends on the film forming polymer since the plasticizer should be compatible with the film forming polymer. Example of suitable plasticizers are dialkyl azelates; glycol dibenzoates; epoxidized soybean oil or tall oil; triaryl, trialkyl and alkaryl phosphate esters such as dioctyl orthophosphate, dialkyl phthalates, polyesters of dibasic acids such as adipic or phthalic with glycols, etc. Of these, the phosphate esters are preferred for enhancement of flame retardency, such as dioctyl phosphate, isodecyl diphenyl phosphate, etc.

The latexes of the thermoplastic film former are commonly prepared by emulsion compolymerization in the presence of a suitable emulsifying agent that stabilizes the emulsion and the polymerization is conducted sufficiently to produce a latex containing from about 35 to 65 weight percent solids. These latexes are commonly available, however, many of the commercially available latexes contain cross linking agents which are typically non-conjugated, polyethylenically unsaturated monomers such as vinyl acrylate, divinyloxylate, vinyl fumarate, N,N-dibutenyl melamine, etc. It is preferred to maintain thermoplasticity of the film former and, accordingly, the latexes useful in the invention should be substantially free of these various cross linking agents.

The source of vapor or gases for the foaming of the film former at its melt temperature is alumina trihydrate. Other inorganic additives besides alumina trihydrate which can be used in minor quantities include gypsum and calcium carbonate. Of these, alumina trihydrate is preferred, and in any instance, constitutes the major component of the inorganic vapor releasing ingredient. If desired, however, up to about 10 percent of the alumina trihydrate can be substituted with gypsum or with calcium carbonate.

The mineral fibers which are used in the invention are chopped or short fibers from about 0.1 to about 0.5 inch, preferably from about 0.1 to about 0.2 inch. The preferred fibers are glass fibers, however, mineral wool fibers or asbestos fibers can also be used if desired. It has been found that the glass fibers are substantially more effective than are the other fibers and the glass fibers are thus preferred for this application.

The pigments which can be included in the composition include the various compounds, salts and oxides of metals such as iron, cobalt, chromium, titanium, tin, antimony, etc. Typical of these are iron oxide, copper oxide, copper sulfate, titanium dioxide, etc. The pigments are used to obtain the desired color of the coating composition.

The shingles are coated by spraying or dipping the shingles with the suspension. In one method, the shingles can be dipped into a vessel containing a suspension of the flameproofing ingredients, withdrawn and dried, preferably at an elevated temperature to hasten the drying process. Dipping the shingles is preferred since it achieves a coating on both sides and thus achieves an ASTM Class I rating in a single treatment. Existing roofs and structures can, of course, be sprayed or coated by brushing. The coating composition dries to a non-tacky surface in approximately 4 hours at ambient temperatures and the heating of the coating composition prior to coating of the wood shingles and/or the heating of the coated shingles hastens this drying process.

Preferably the shingles are coated at an elevated temperature, typically at a temperature about 150 to about 200 degrees F. and is thereafter maintained at an elevated temperature in an oven were it is contacted with air heated to a temperature of about 250–280 degrees F. For this purpose, the bath of coating suspension can be maintained at a temperature from 125 to about 200 degrees F. Suitable indirect heating equipment such as a jacketed vessel or steam coils can be used to maintain the suspension at this temperature. At the elevated temperature, the coated substrate dries to a non-tacky surface in approximately 5 to 15 minutes and can thereafter be packaged, handled and stored in a manner similar to that used for the uncoated wood substrates. During the drying step, the coating composition is not heated to 280 degrees or greater to avoid any decomposition of the alumina trihydrate.

An alternative method for heating of the coating shingles is to pass the coated shingles through a microwave oven cavity where the shingles are exposed to microwave radiation. Commercial microwave ovens can be used for this application. This treatment is effective in drying of the coating since the radiation couples to the free water in the coating but not to the water of hydration of the alumina, thereby heating the free water and evaporating this water from the coating without dehydration of the alumina trihydrate.

The practice of the invention will be illustrated with the following examples which also demonstrate the results which can be obtained by practice of the invention:

EXAMPLE 1

This example illustrates the hardness characteristics of the fire resistant caulking of the invention before and after exposure to flame. The fire resistant caulking was placed on a wood shingle coated with a flame proofing as intended for normal use. The shingle was fully cured and was at room temperature when the caulking was applied. Two hardness testers were used.

Type A Durometer ASTM D-676-599
Type D Durometer ASTM D-1484

The flame resistant caulking had composition which is set forth in the following Table 2:

TABLE 2

| QUANTITY | INGREDIENT |
|---|---|
| 5 gals. | Water |
| 1 gal. | Propylene Glycol |
| 1.5 lbs.* | Hydroxyethyl Cellulose |
| 9 gals. | Polyvinyl acetate |
| 1.5 gals. | Monsanto Santicizer 148 |
| 100 lbs. | Hydrated Alumina |
| 9 lbs. | ⅛ inches Milled Fiberglass |
| 1 lb. | Burnt Umber |

*sufficient quantity to form a pasie

The ingredients were mixed in a low speed, low shear mixer. The water, propylent glycol, hydroxyethyl cellulose were mixed to a thick gel having the ability to peak like whipped egg whites. The, the remaining ingredients were added slowly and the mixing speed was increased to mix the ingredients until the material was smooth.

At room temperature and before flame exposure the hardness testers give the following readings: 75 Type A; and 30 Type D. Several small cracks were located to test the ability of the material to seal itself. These are hairline cracks of no more than 1/32 inches.

The area was heated with a propane torch held at a distance of approximately 4 inches from the shingle for 30 seconds. Two of the three cracks observed closed by the expansion of the caulking material. The expansion results from liberation of the water in the alumina hydrate, causing the material to soften and to bubble. The largest crack did not close completely on this limted test. Immediately after the torch was removed, the hardness testers gave the following readings: 20 Type A; and 10 Type D. The material was noticeably softer after exposure to the flame and on expansion, sealed the flame from the roof deck.

Other thixotropic additives were also used to obtain a paste consistency of the fire resistant coating composition and thereby prepare a caulking composition for use in the invention. The following is an example of a caulking composition which gave similar results to those obtained with the composition set forth in Table 3:

TABLE 3

| QUANTITY | INGREDIENT |
|---|---|
| 5 gallons | Water |
| 9 gallons | Polyvinyl acetate |
| 1.5 gallons | Monsanto Santicizer 148 |
| 100 lbs. | Hydrated Alumina |
| 9 lbs. | ⅛ inch milled fiberglass |
| 1 lb. | Burnt umber |
| 3 lbs. | Fumed silica (Cab-O-Sil M5) |

The liquid ingredients were mixed in a low speed, low shear mixer. The solid ingredients (hydrated alumina, fiberglass, and pigment) were added during mixing. The compositon was brought to a nonflow thixotropic and paste consistency by addition of the funed silica slowly while mixing. The mixing was continued until a smooth mixture was obtained.

EXAMPLE 2

The following describes the procedure used to construct a deck which simulates a roof for the evaluating the flame resistance of the caulking under testing according to ASTM E-108.

The deck was made to 52 inches×40 inches dimension. It consisted of two 52 inches long 2×4s onto which wood sheathing (3½ inches × ¾ inches × 40 inches) was nailed. The sheathing was spaced 1¾ inches apart to form what is best described as a pallet. The frame was then covered with asphalt roofing felt. The felt was tacked down in rows from the bottom to the top of the frame, overlapping at least 2 inches.

Shingles used for this deck were new cedar shakes. The shingles were nailed to the frame in courses from bottom to top, with each course overlapping at least half the previous course. The gaps between the shingles of adjacent courses were maintained out of alignment.

Once complete, the deck was sprayed with a coating at least 30 mils, wet thickness, of a flame-proofing composition over its entire surface. Special attention was given to the bottom edges of the shingles and to the spaces between the shingles. The flame proofing composition had the following composition:

TABLE 4

| 6.5 lbs. | Water |
|---|---|
| 5 ozs. | Hydroxyethyl Cellulose |
| 1.8 lbs. | Propylene Glycol |
| 1.8 lbs. | Monsanto Santicizer 148 |
| 14 lbs. | Polyvinyl acetate Resin-emulsion (50% solids) |
| 15 lbs. | Hydrated Alumina |
| 1.9 gals. | Water |
| .25 lbs. | Burnt Umber |

The water, hydroxyethyl cellulose, propylene glycol were mixed at low speed in a low shear mixer until the mixture gelled to a thick consistency with the ability to peak, as whipped egg whites. The gel was poured into a high shear mixer and the remaining ingredients were added and mixed until smooth.

When dry, all the spaces between the shinges were caulked with a flame proofing caulking. The spaces underneath the bottom edge of each course of shingles was caulked. This caulking filled and sealed all spaces where air (and flames) could travel under and between the shingles.

The results of the ASTM E-108 type intermittent flame test of the roof deck of cedar shakes top coated with a flame proofing composition and with the flame resistant caulking between the shingles are set forth in the follows table:

TABLE 5

| Time | Flame Operation | Remarks |
|---|---|---|
| 10:53 a.m. | On: 1 minute | No ignition |
| | Off: 2 minutes | |
| | On: 1 minute | No ignition |
| | Off: 2 minutes | |
| 10:58 a.m. | On: 1 minute | |
| | Off: 2 minutes | |
| 11:01 a.m. | On: 2 minutes | Some ignition |
| | Off: 2 minutes | |
| 11:06 a.m. | On: 2 minutes | |
| 11:08 a.m. | Off: 2 minutes | Some ignition |
| 11:10 a.m. | Flame on-2 minutes | Ignition |
| 11:12 a.m. | Test terminated | |

This roof passed Class C, but did not meet Class B requirements.

EXAMPLE 3

In this example, the roof deck construction described in Example 2 was repeated, however, the shingles used for this deck were new cedar shakes which were completely encapsulated with at least 30 mils set thickness coating of the fire proofing agent of Table 2. The first course of shingles was nailed on the bottom of the deck and was caulked with a continuous horizontal bead of the flame resistant caulking of Table 1, approximately 1 inch under the lower edge and also in between each shingle. All voids were filled producing a solid shield of material through which the deck could not be seen. The next course of shingles overlapped the first, leaving one-half of the first course exposed. The second course was also caulked with the flame resistant caulking of Table 3 about 1 inch under its edge. On this and following courses, the space between the shingle was caulked only where the next row overlapped it. Therefore, the continuous horizontal beads of caulking between the courses of shingles were unexposed and could not be seen from an exterior view.

Subsequent courses were continued in this manner until the deck was completed roofed. The last course was caulked underneath as before, and all spaces between adjacent shingles were filled.

The resultant roof was tested by a test procedure following ASTM E-108. The test of the roof deck gave the following results:

TABLE 6

| Time | Flame Operation | Remarks |
|---|---|---|
| 11:30 a.m. | On: 1 minute A "B" flame temp. | O.K. |
| 11:31 a.m. | Off: 2 minutes | |
| 11:33 a.m. | On: 1 minute | $Al_2O_3.3H_2O$ giving off water |
| 11:37 a.m. | Off: 2 minutes | (Class C status passed). |
| 11:40 a.m. | On: 2 minutes | Looking good |
| | Off: 2 minutes | |
| 11:44 a.m. | On: 2 minutes | Still no |
| | Off: 2 minutes | ignition |
| 11:48 a.m. | On: 2 minutes | May be slight ignition |
| | Off: 2 minutes | No ignition after flame off |
| 11:52 a.m. | On: 2 minutes | O.K. |
| | Off: 2 minutes | O.K. |
| 11:56 a.m. | On: 2 minutes | |
| | Off: 2 minutes | |
| 12:00 | On: 2 minutes | No ignition |
| | Off: 2 minutes | |
| 12:04 p.m. | On: 2 minutes | No ignition |
| | Off: 2 minutes | |

TABLE 6-continued

| Time | Flame Operation | Remarks |
|---|---|---|
| 12:08 p.m. | On: 2 minutes | No ignition |
| | Off: 2 minutes | Pass Class B+ |
| 12:12 p.m. | On: 2 minutes | Pass |
| | Off: 2 minutes | |
| 12:16 p.m. | On: 2 minutes | Pass |
| | Off: 2 minutes | |
| 12:20 p.m. | On: 2 minutes | Pass |
| | Off: 2 minutes | |
| 12:24 p.m. | On: 2 minutes | Pass |
| | Off: 2 minutes | |
| 12:28 p.m. | Flame on-2 minutes | Pass |
| | Flame off-2 minutes | |
| 12:32 p.m. | Flame on-2 minutes | No ignition |
| | Flame off-2 minutes | |
| 12:36 p.m. | Flame on-2 minutes, then test terminated. | |

The test panel passed Class A requirements.

The invention has been described with reference to the illustrated and presently preferred embodiments. It is not intended that the invention be unduly restricted by the illustrated and presently preferred embodiments. Instead, it is intended that the invention be defined by the steps, and materials, and their obvious equivalents, set forth in the following claims.

What is claimed is:

1. A method of flame proofing a shingled roof covering which comprises:
   (a) coating at least the outside surface of the shingles of said roof covering with a flame proofing composition; and
   (b) sealing the undersurfaces of said shingles and the underlying structure by applying at least one continuous bead of a flame proofing caulking composition comprising a thermoplastic film former, alumina trihydrate, and sufficient thixotropic agent to provide a caulking consistency across each course of said shingles, thereby interposing at least one continuous bead of said flame proofing caulking between each course of shingles and the immediately subjacent course.

2. The method of claim 1 wherein said flame proofing composition is an aqueous suspension of 40 to 65 weight percent solids which solids comprise:
   (a) ambient temperature former ingredients selected from the class consisting of polyvinyl acetate, polyacrylates, styrene-butadiene polymers and halogenated derivatives thereof, and copolymers thereof, and
   (b) high temperature barrier forming ingredients including from 40 to 80 weight percent of alumina trihydrate, and from 2 to 10 weight percent of glass fibers, of said composition, expressed on a water-free basis.

3. The method of claim 3 applied to an existing roof covering wherein said continuous bead is applied horizontally along the base of each course of shingles.

4. The method of claim 4 wherein additional beads of said flame proofing caulking are applied to fill the open gaps between the edges of adjacent, individual shingles.

5. The method of claim 3 applied to a new roof installation wherein said continuous bead is applied horizontally across each course of shingles in the unexposed area and thereafter covered by application of the next, successive course of shingles.

6. The method of claim 5 including the application of a plurality of continuous beads across each course of shingles.

7. The method of claim 6 including the application of said flame proofing caulking to fill the open gaps between the edges of adjacent shingles.

8. The method of claim 7 wherein said flame proofing caulking is an aqueous suspension of 40 to 65 weight percent solids which solids comprise:
   (a) ambient temperature film former ingredients selected from the class consisting of polyvinyl acetate, polyacrylates, styrene-butadiene polymers and halogenated derivatives thereof, and copolymers thereof, and
   (b) high temperature barrier forming ingredients including from 40 to 80 weight percent of alumina trihydrate, and from 2 to 10 weight percent of glass fibers, and
   (c) sufficient of a thixotropic agent to form a paste of caulking consistency.

9. The method of claim 2 including the additional step of drying said coating of flame proofing covering by placing said shingles in an oven maintained at an air temperature from 250° to 280° F.

10. The method of claim 1 wherein said flame proofing caulking composition comprises a paste of:
    (1) an aqueous suspension of 40 to 65 weight percent solids which comprise:
       (a) ambient temperature film former ingredients selected from the class consisting of polyvinyl acetate, polyacrylates, styrene-butadiene polymers and halogenated derivatives thereof, and copolymers thereof, and
       (b) high temperature barrier forming ingredients including from 40 to 80 weight percent of alumina trihydrate, and from 2 to 10 weight percent of glass fibers, of said composition, expressed on a water free basis, and
       (c) sufficient of a thixotropic agent to form a paste of caulking consistency.

11. The method of claim 10 wherein said solids comprise from 60 to 70 weight percent of aluminum trihydrate.

12. The method of claim 10 wherein said solids comprise from 20 to about 40 weight percent of said film former ingredients.

13. The method of claim 10 wherein said solids comprise from to about 35 weight percent of said film former ingredients.

14. The method of claim 12 wherein said solids comprise from 4 to about 10 weight percent of a plasticizer for said film former ingredients.

* * * * *

UNITED STATES PATENT AND TRADEMARK OFFICE
CERTIFICATE OF CORRECTION

PATENT NO. : 4,671,040
DATED : Jun. 9, 1987
INVENTOR(S) : Charles H. Braithwaite, Jr.

It is certified that error appears in the above—identified patent and that said Letters Patent is hereby corrected as shown below:

In the claims:

Claim 13, line 20, after "from" insert --25--

Signed and Sealed this

Third Day of November, 1987

*Attest:*

DONALD J. QUIGG

*Attesting Officer*   *Commissioner of Patents and Trademarks*